(12) United States Patent
Verdun

(10) Patent No.: US 6,988,214 B1
(45) Date of Patent: Jan. 17, 2006

(54) PROCESSOR POWER STATE TRANSISTIONS USING SEPARATE LOGIC CONTROL

(75) Inventor: Gary J. Verdun, Belton, TX (US)

(73) Assignee: Dell Products L.P., Round Rock, TX (US)

( * ) Notice: Subject to any disclaimer, the term of this patent is extended or adjusted under 35 U.S.C. 154(b) by 777 days.

(21) Appl. No.: 09/707,585

(22) Filed: Nov. 6, 2000

(51) Int. Cl.
G06F 1/32 (2006.01)

(52) U.S. Cl. .................. 713/320; 713/2; 713/322; 713/601

(58) Field of Classification Search .............. 713/2, 713/300–320, 322–324, 601
See application file for complete search history.

(56) References Cited

U.S. PATENT DOCUMENTS

| | | | |
|---|---|---|---|
| 5,099,196 A | 3/1992 | Longwell | 324/158 R |
| 5,115,503 A | 5/1992 | Durkin | 395/550 |
| 5,369,771 A | 11/1994 | Gettel | 395/750 |
| 5,513,340 A | 4/1996 | Kowert | 395/550 |
| 5,835,750 A | 11/1998 | Pan-Ratzlaff | 395/500 |
| 5,862,368 A | 1/1999 | Miller et al. | 395/553 |
| 6,272,642 B2 * | 8/2001 | Pole et al. | 713/300 |
| 6,347,379 B1 * | 2/2002 | Dai et al. | 713/320 |
| 6,473,810 B1 * | 10/2002 | Patel et al. | 710/7 |
| 6,496,888 B1 * | 12/2002 | Pole, II | 710/110 |
| 6,601,178 B1 * | 7/2003 | Gulick | 713/322 |
| 6,633,987 B2 * | 10/2003 | Jain et al. | 713/300 |

* cited by examiner

Primary Examiner—Dennis M. Butler
(74) Attorney, Agent, or Firm—Haynes and Boone, LLP

(57) ABSTRACT

A computer system having a logic device capable of accepting various chipset controllers and interfacing them with a personal computer processor, the logic device capable of placing the processor into a deep sleep state so that the processor can perform power state transitions. The power state transitions place the processor into a battery optimizing mode or a performance optimizing mode. The logic device allows chipset controllers that may or may not have the capability to perform power state transitions to interface with the processor. The logic device either passes power transition signals through to the processor from the chipset controller or performs the power state transitions. Various chipset and chipset controllers may therefore interface with a processor and are able to switch between battery optimized and performance optimized modes.

9 Claims, 10 Drawing Sheets

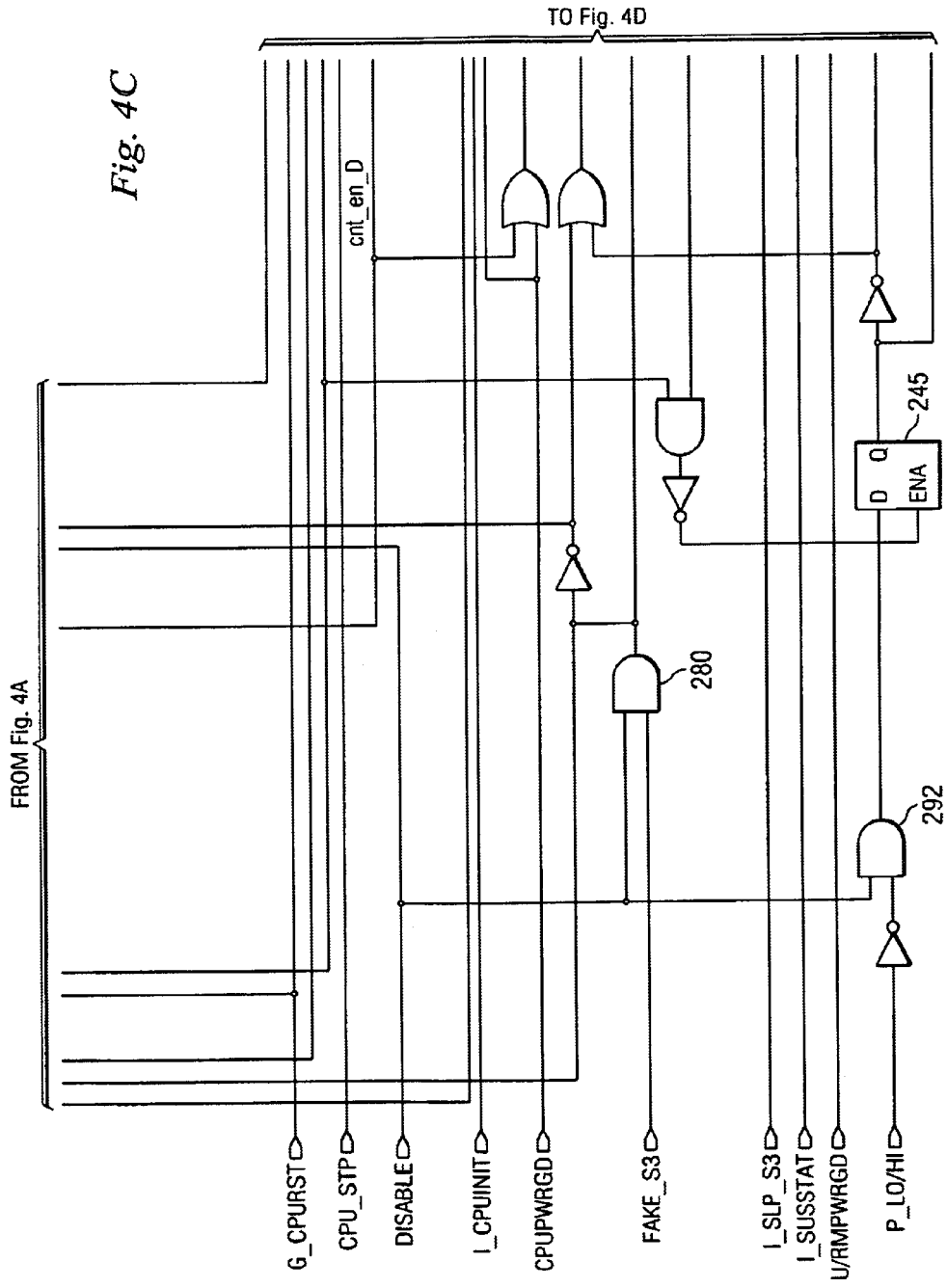

PROCESSOR POWER STATE TRANSISTIONS USING SEPARATE LOGIC CONTROL

BACKGROUND

This disclosure relates to a computer system, and more particularly to a mobile computer system using a power conserving processor interfaced with a logic device that allows chipset controllers to pass control signals placing the processor into a deep sleep state or having the logic device place the processor into a deep sleep state in order for the processor to switch power operating modes.

DESCRIPTION OF THE RELATED ART

A personal computer's (PC) central processing unit (CPU) or processor is tied directly to the computer system via the chipset. The chipset is the set of controllers on the "motherboard" of a PC, controlling the busses to and from the processor. Often the terms "motherboard" and "chipset" are used interchangeably. Many technologies meet on the motherboard and are "glued" together via the chipset. Without the chipset, neither random access memory (RAM) nor input output (I/O) busses could function together with the processor.

Processors typically are designed to be compatible with certain chipsets. Processors used in mobile PC systems are designed to operate with chipsets designed for mobile PC systems. Likewise, processors used for desktop PC systems use chipsets that are generally designed for a desktop PC system.

PCs continue to improve adding new technology and features, including enhanced video I/O, audio I/O, greater communication speeds, and enhanced graphics. Mobile PCs may see these new technologies and features well after they have been integrated into desktop PCs. Often this is because a mobile PC has inherent system requirements over that of a desktop. To integrate these new features into a mobile PC would require additional design work. The unique system requirements of mobile PCs include cooling, physical size and placement allocation, and energy management. Fewer and relatively simplistic system requirements needed by a desktop PC, allow new chipsets with new technology to be developed first for the desktop PC system and processors.

Technologies seen in the new desktop PC chipsets later may migrate over to mobile PC systems. Typically, some or a great deal of modification is needed on existing desktop PC chipsets to allow them to function with a mobile PC processor and system.

For mobile PCs, battery power consumption continues to be a major consideration, if not a problem. To conserve battery life, schemes have been implemented to reduce processor operating frequencies and lower voltage. One particular implementation is the Intel® Speedstep™ technology that reduces the operating clock speed of the mobile PC processor and lowers voltage. A frequency and voltage pair is associated with the operating mode. Lower frequency and voltage is referred to as "battery optimized mode." Higher frequency and higher voltage is referred to as "high performance mode." The voltage provided to the processor must meet the core voltage specification for the present operating mode. If an operating mode transition is made, then the system must direct the voltage regulator to regulate to the voltage specification of the other mode. The user, regardless of mode, may also set the operating mode.

Intel® Speedstep™ technology processors are used as an example in describing background art, however, other processors may make use of similar technology described herein. Intel® Speedstep™ technology is widely used on mobile PC processors sold by the Intel® Corporation.

Intel® Speedstep™ technology depends on power state transitions, namely a transition that places the processor in a deep sleep or C3 state, as defined under the Advance Configuration and Power Interface (ACPI) Specification. The C3 state is one of several power states defined by ACPI. Other ACPI states include C0 or fully operational state; intermediary transition states C1 and C2; and very low power C4 state.

Processors using Intel® Speedstep™ technology utilize internal clock multipliers to set the operating frequency. A low multiplier is used for battery optimized mode and a high multiplier is used for high performance mode. The operating frequency is set when the processor transitions from C3 state to C0 state.

Because communication and control functions are handled by chipset controllers, placing a processor, such as one with Intel® Speedstep™ technology, into C3 or deep sleep requires that chipset controllers have the ability to provide C3 or deep sleep command and control to the processor. Many chipsets, namely desktop PC chipsets, do not have the ability to support such a power state transition and therefore cannot support a processor using Intel® Speedstep™ or similar power conserving technology. The situation is not limited to desktop PC chipsets, but applies to all chipsets that cannot support a C3 power state transition.

Processors using Intel® Speedstep™ technology, default to the battery optimized mode when coming out of reset. Reset occurs when powering a processor on from the C4 state. After reset, the processor will start in the lower of its two core frequencies and a lower voltage. Therefore, any reset assertion will force the processor to the lower frequency and the power supply to a lower core voltage. When using an Intel® Speedstep™ processor connected to a chipset that does not support transitioning the processor into the C3 state, the processor cannot be placed into the performance mode, because the default is to battery optimized mode after assertion of the reset signal.

To get a processor into performance mode, the processor is placed into a C3 state. The C3 state is achieved in one of two ways depending upon initialization options.

Initialization of the processor involves initialization of internal processor logic and latches which is performed by hardware when a reset signal is asserted and clock cycles passed to the processor. After a reset condition, the processor fetches executable code from system read only memory (ROM). The processor goes to its reset vector and begins reading code to execute. Thereafter, the north-bridge controller (memory controller hub) is initialized; memory is enabled; all caches are configured and enabled; and the chipset, including the south-bridge controller (input output control hub) is initialized.

The initialization options will determine if the processor supports a Stop Grant state or Quick Start state when a stop clock signal (STPCLK) to the processor is asserted.

Now referring to FIG. 1, a diagram illustrates the timing involved in getting a processor into deep sleep or C3 mode in order to make the power state transition from high performance to battery optimized, or vice versa. In this particular application a Stop Grant cycle "stpgnt" 9 is received by the CPU bus 14. BCLK 10 is the Bus Clock signal that represents the system bus clock. External timing parameters are specified with respect to BCLK 10. STPCLK 12 is the Stop Clock signal. When STPCLK 12 is asserted it causes the processor to enter a low-power Stop Grant 4 state. The processor issues a Stop Grant Acknowledge special transaction and stops providing internal clock signals. When STPCLK 12 is dc-asserted, the processor restarts its internal clock to all units and resumes execution. The assertion of STPCLK 12 has no affect on the bus clock and BCLK 10. SLP# 16 is the Sleep signal. When SLP# 16 is asserted in the Stop Grant 4 state, this causes the processor to enter the Sleep 6 state. During the Sleep 6 state, the processor stops providing internal clock signals to all units. The processor will only recognize changes in the SLP# 16, STPCLK 12, and reset signals while in the Sleep 6 state. If SLP# 16 is de-asserted, the processor exits Sleep 6 state and returns to the Stop Grant 4 state, proceeding to the Normal 2 state. Compatibility Signals 17 of the system are suspended when entering and exiting Sleep 6 state transitional periods.

Now referring to FIG. 2, a diagram illustrates the timing involved in getting a processor from a Quick Start state. In this particular application a Stop Grant cycle "stpgnt" 9 is received by the CPU bus 14. The Quick Start 5 state is entered by the processor with the assertion of the STPCLK 12 signal when it is configured for the Quick Start 5 state. A transition to the Deep Sleep 8 state is performed by stopping the clock input to the processor. A transition back to the Normal 2 state from the Quick Start 4 state is made only if the STPCLK 12 signal is de-asserted. While in this state the processor is limited in its ability to respond to input. Compatibility Signals 17 of the system are suspended when entering and exiting the Quick Start 5 state transitional, periods.

The Deep Sleep 8 state is the lowest power mode the processor can enter while maintaining its context. The Deep Sleep 8 state is entered by stopping the BCLK 10 input to the processor, while it is in the Sleep 6 state or Quick Start 5 state. For proper operation, the BCLK 10 input should be stopped in the low state (not running). The processor will return to the Sleep 6 or Quick Start 5 state from the Deep Sleep 8 state when the BCLK 10 input is restarted. There is a delay of up to 30 msec after the clocks have started before this state transition happens.

If Quick Start is enabled then getting the processor into the C3 state involves asserting STPCLK, waiting the appropriate time or for the Stop Grant Acknowledge bus cycle on the processor bus, and then stopping the clock to the processor. If Quick Start is not enabled, getting the processor into the C3 state involves asserting the STPCLK signal, then the sleep signal to the processor must be asserted after the appropriate wait or for the Stop Grant Acknowledge bus cycle to run on the processor bus. The processor clock can then be stopped after a set time period proceeding assertion of the sleep signal to the processor. At this time the processor will be in the C3 state.

Returning the processor to the operating state or C0 state is done by reversing the sequence used to get it into the C3 state.

When a stop clock (STPCLK) is asserted to the processor, depending on the power up configuration of the processor, the processor goes into Stop Grant state or Quick Start state, as discussed earlier. The processor performs internal bookkeeping and transitions to a lower power state. Upon transitioning to the lower power state the processor sends out a Stop Grant Acknowledge bus cycle. The Stop Grant Acknowledge bus cycle indicates that the processor is ready to make the power state transition. Monitoring the Stop Grant Acknowledge bus cycle, however, involves additional expense to add the needed logic. In the alternative, a sufficient wait period can take place to assure that the Stop Grant Acknowledge bus cycle has occurred before a lower power state transition can be asserted.

The time it takes a processor to get to a Stop Grant Acknowledge bus cycle depends up on the activity the processor has cued up. For example during processor initialization, the processor performs micro-code initialization and fetches instructions from the basic input output system (BIOS) or the system read only memory (ROM). The first code that is fetched is the signal indicating that the processor is trying to retrieve executable code. This first fetch to ROM triggers the assertion of the STPCLK signal.

The first cycle that occurs on the processor bus is ROM access. When reset goes away, a wait is completed for one clock cycle, and the chipset controller asserts a sleep signal which places the processor into the next lower state. Placing the processor in the next lower power state allows transitioning the processor into an even lower power state. In this application, only the reset condition needs to be monitored.

In Intel® Speedstep™ chipsets, the power management controller resides in the south-bridge controller also known as the input output controller hub (ICH). The north-bridge controller or memory controller hub (MCH) passes all cycles/instructions not intended for itself on to the south-bridge controller. The cycles/instructions that are passed include those intended for the power management controller residing in the south-bridge controller.

Power state transition problems arise when either or both the north-bridge controller land the south-bridge controller require special handshaking or messages passed between them during power state transitions that are incompatible. In this case one or both of the devices may actually support the power state transitions. Because the handshaking/message passing is not compatible, transitions result in a lock up condition such as a controller waiting on a response that never occurs or getting an unexpected/wrong response.

A problem arises as well when a controller, namely a south-bridge controller, has a power management controller that contains logic to detect the Stop Grant Acknowledge bus cycle. The logic and detection are used as an indication that the processor has achieved the Stop Grant state or the Quick Start state. Receipt or detection of the Stop Grant Acknowledge bus cycle is used to trigger transition to the next power state on the processor. After the controller core logic is configured it is possible that one or both of the controllers may respond poorly to an unexpected Stop Grant Acknowledge bus cycle. The processor will send a Stop Grant Acknowledge bus cycle out during the C0 to C3 transition needed to force the transition of the processor to performance mode. Because something other than the north-bridge controller or the south-bridge controller caused the transition, the resulting Stop Grant Acknowledge bus cycle is not expected to occur.

Another problem arises when neither the south-bridge controller nor the north-bridge controller supports power state transitions. Therefore to force the state transitions on the processor, some device must assert the control signals.

Without support of power state transitions it is very unlikely that neither the south-bridge controller nor the north-bridge controller would do anything other than pass the Stop Grant Acknowledge bus cycles when they occur. Prior to chipset initialization it is most likely that the chipset will merely pass through cycles it has not been configured to accept or respond to.

Chipsets and chipset controllers that are not designed to work with power saving processors such as an Intel®

Speedstep™ processor are unable to pass power state transition signals through because the controllers lack the necessary control and logic. The processor therefore cannot be placed into a C3 state in order.

SUMMARY

Problems identified above are addressed by the present disclosure of transitioning power states of processors using separate logic control. This disclosure relates to providing logic that will enable a chipset to transition a power conserving processor into "deep sleep" or C3 state, and also to transition the processor to "operating" or C0 state. This disclosure allows previously non-compatible chipsets to work with power conserving processors, processors frequently used in a mobile PC system.

One embodiment involves using logic that forces the processor into the C3 state from C0 state and back into the C0 state during the normal power up sequence of the computer system. The logic asserts the appropriate control signals to the processor and the clock chip. This sequence occurs prior to the core logic chipset being initial ized and prevents conflicts with the lack of support of the C3 state by the chipset.

One embodiment includes having the logic assert itself while the processor is still in reset. A stop clock signal (STPCLK*) is latched and ignored until the processor reset has de-asserted. Upon reset de-assertion the processor begins state transition to the C3 state. This sequence occurs prior to the core logic chipset being initialized.

One embodiment has the STPCLK* to the processor asserted at a fixed time period, in other words timed to assert using one or two suspend clocks, after de-assertion of the processor reset signal. This sequence occurs prior to the core logic chipset being initialized.

One embodiment has the STPCLK* to the processor asserted when the first fetch to ROM is performed.

One embodiment makes use of a simulated suspend to ram (S3) state for the system.

One embodiment makes use of placing only the processor into a simulated S3 state allowing state transition to occur in a shorter time period to allow for changes to the processor operating mode, and avoiding noticeable differences in system operation.

Variations of the previously mentioned embodiments involve full control or partial control of the logic, depending on the ability of a chipset controller to perform power state transitions.

One embodiment includes where the logic looks for the first fetch to ROM to trigger the assertion of the STPCLK* signal. This would be useful in cases where a processor does not allow assertion of STPCLK* before or soon after reset de-assertion.

All the embodiments with the exception of the simulated S3 and processor only S3 are methods to assure the transition occurs prior to chipset initialization and that the transition to a lower power state other than Quick Start/Stop Grant does not occur prior to the processor being ready for it. The processor being ready is indicated by the Stop Grant Acknowledge bus cycle which we are assuming that the PLD logic will not see because this would require significant additional logic and cost. Sufficient wait is made to assure the processor is reset.

BRIEF DESCRIPTION OF THE DRAWINGS

FIGS. 4a–4d are a schematic of the programmable logic device (PLD) used to control power state transitions.

The use of the same reference symbols in different drawings indicates similar or identical items.

DETAILED DESCRIPTION OF THE PREFERRED EMBODIMENTS

Figure 1:
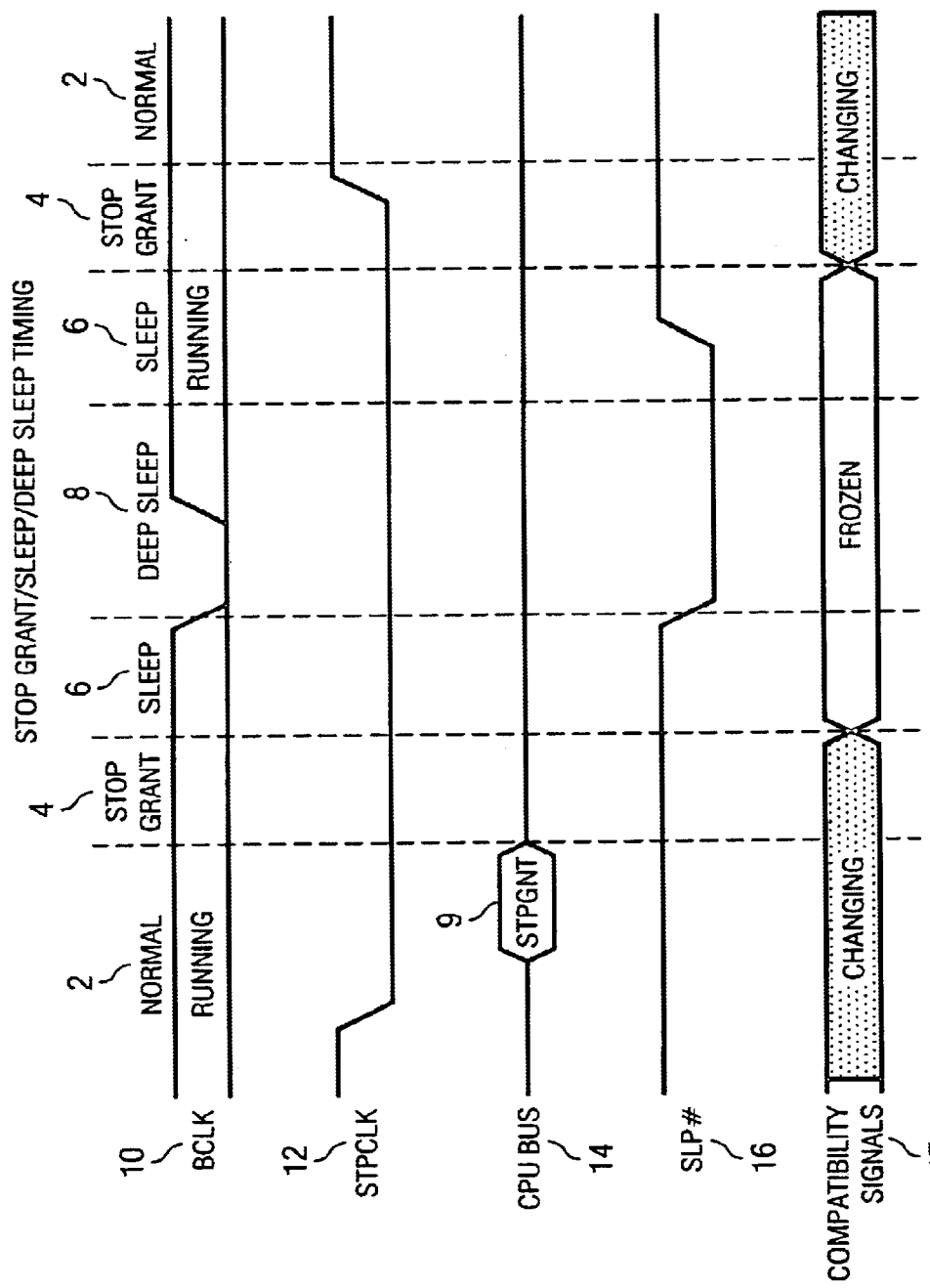
FIG. 1 is a timing diagram used to get a processor into Deep Sleep from a Stop Grant.
Figure 2:
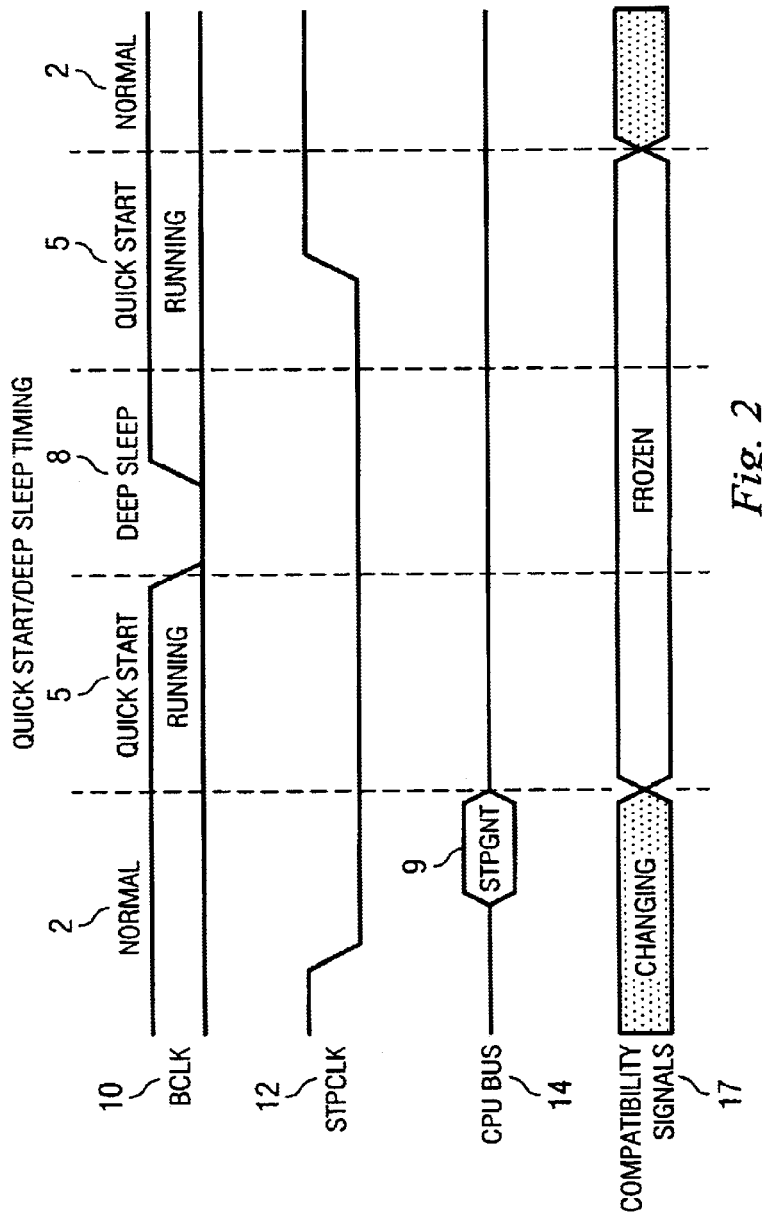
FIG. 2 is a timing diagram used to get a processor into Deep Sleep from a Quick Start.
Figure 3:
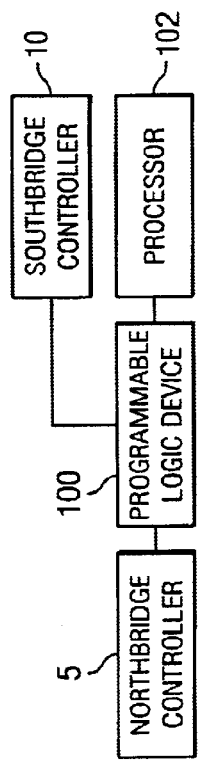
FIG. 3 is a top level block diagram of the PC system.
Figure 4A:
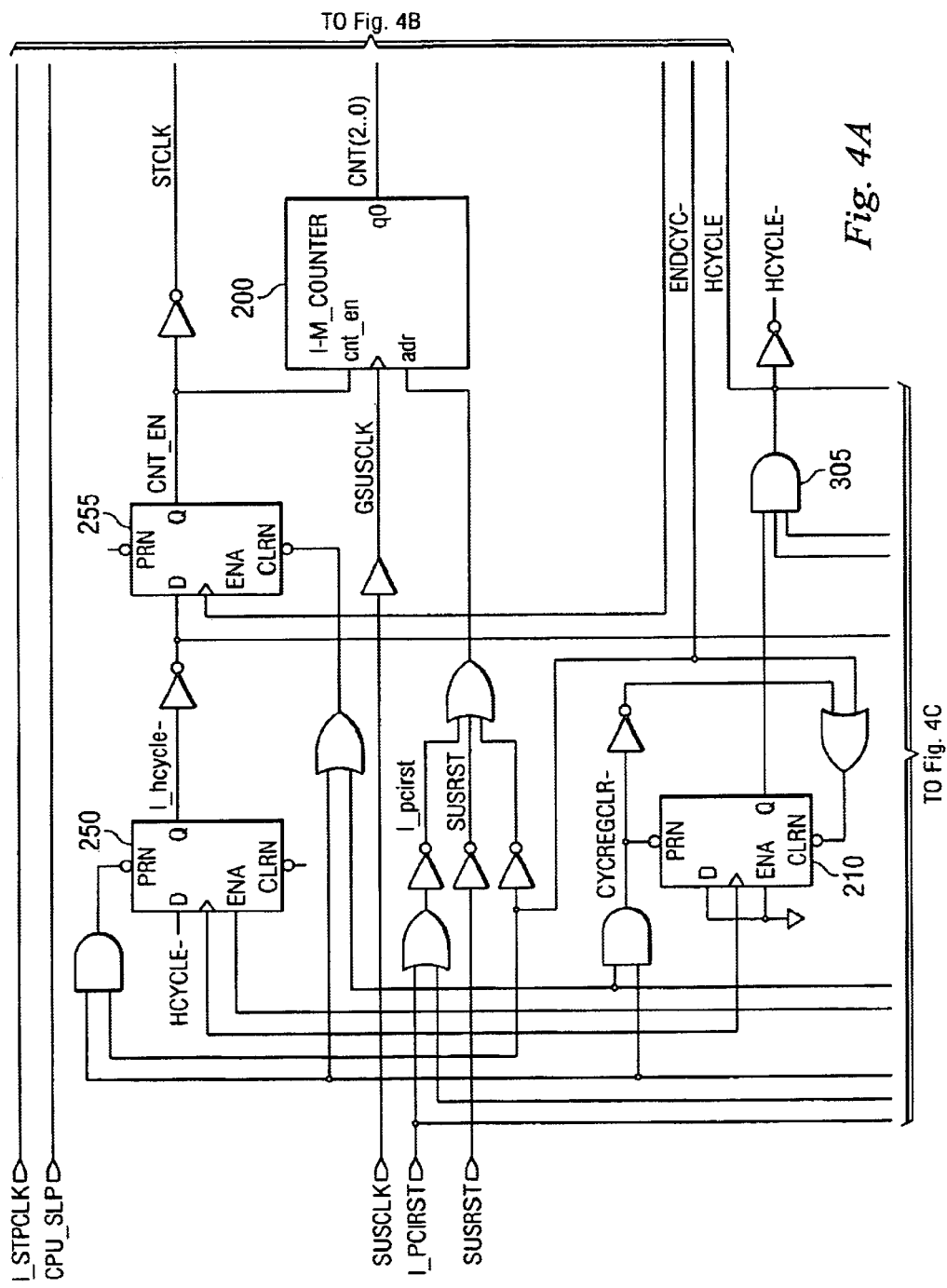
Figure 4B:
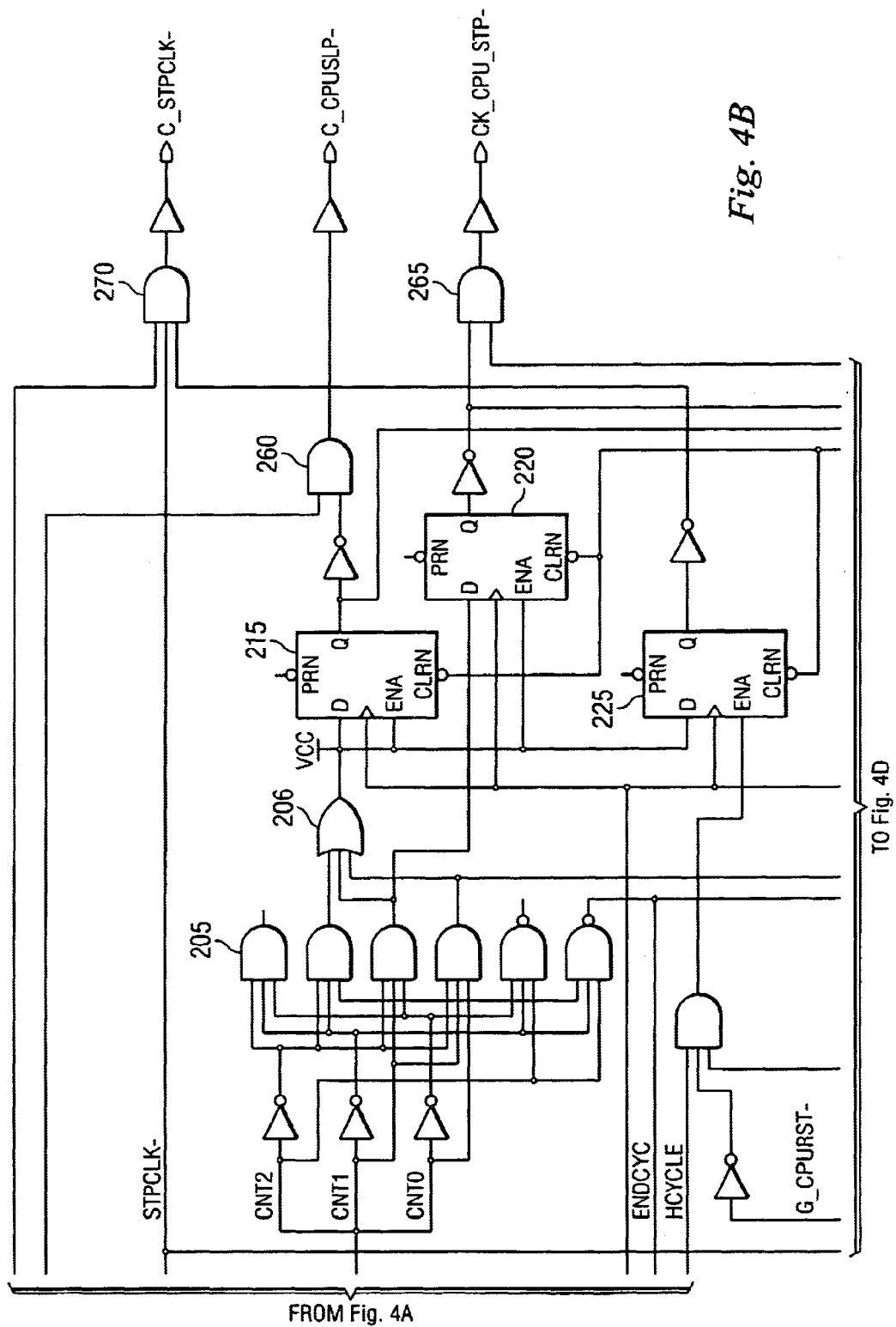
Figure 4D:
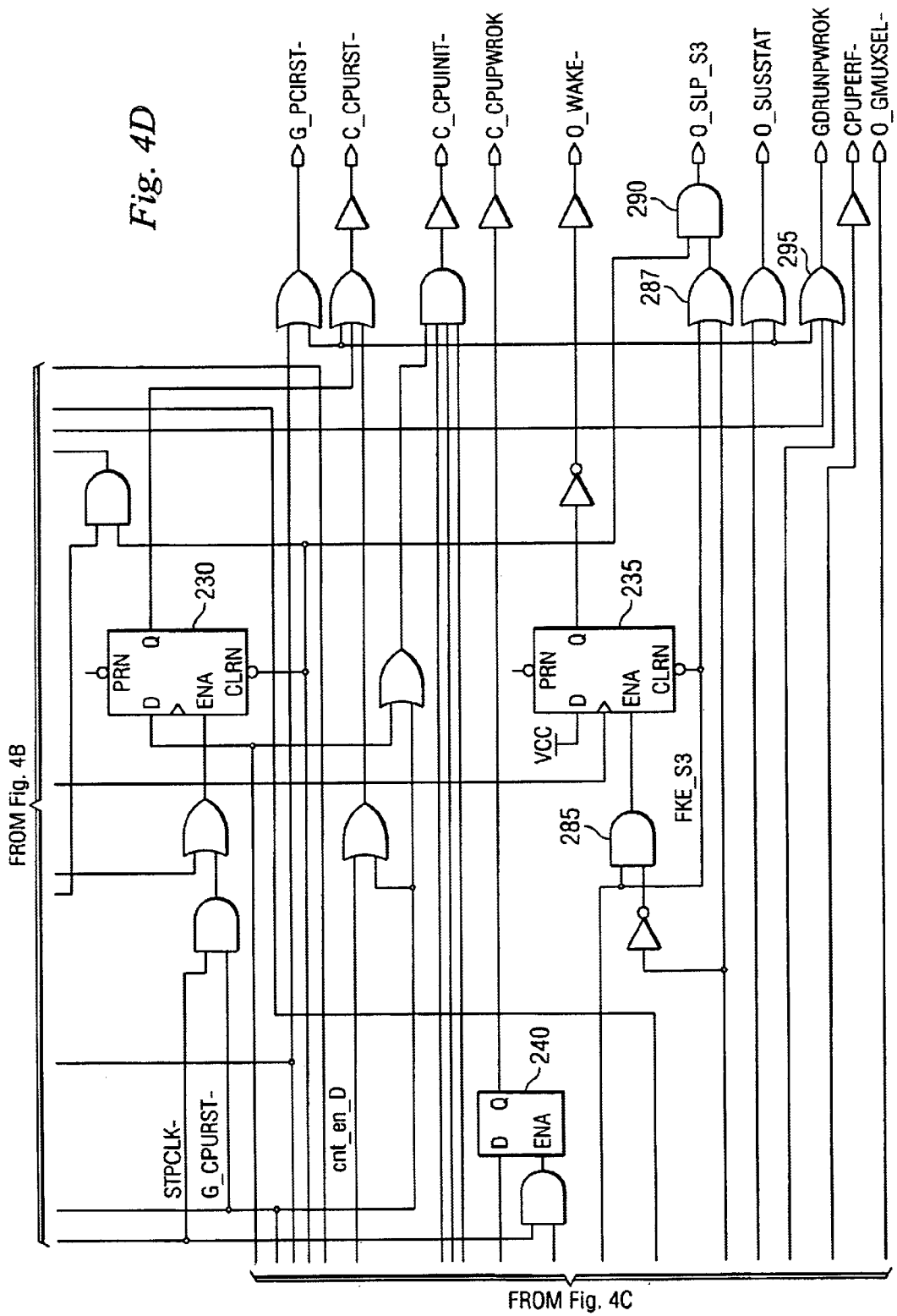

Now referring to FIG. 3, illustrated is a top level diagram of the PC system showing the interface between chipset controllers, north-bridge controller 5 and south-bridge controller 10 to PLD 100 and processor 102. Select power control signals from north-bridge controller 5 and south-bridge controller 10 are passed to the processor 102 by way of PLD 100. The signals that are passed through PLD 100 are involved in placing the processor into a deep sleep or C3 state and bringing the processor back into operating or C0 state.

The following table defines the signals used by embodiments of the computer system in performing the processor power state transitions.

| Signal | Definition |
| --- | --- |
| C_CPUPWROK | Power OK indication to the processor from the PLD |
| C_CPURST- | Processor reset signal from the PLD |
| C_CPUSLP- | CPU Sleep control signal to the processor from the PLD |
| C_STPCLK- | Processor stop clock signal from the PLD |
| CLK | PLD clock input |
| CPU_STP | Input signal to the clock generator that controls the processor clock. When this signal is active the processor clock shall be stopped. |
| CPUCLK | Clock signal to the processor. |
| CPUPERF- | CPU performance signal to the processor. A low on this signal during processor exit of the C3 state will cause the processor to transition to the performance mode. |
| CPUPERF* | |
| CPUPWRGD | Processor power good signal input to the PLD |
| CPUREST- | Processor reset signal input to the PLD |
| CPURST- | |
| CPUSLP | Processor CPU sleep control signal input to the PLD |
| DRUNPWROK | Logical AND of Core regulator, processor I/O regulator, Power management reset- signals. |
| G_CPURST- | CPU reset signal out of the PLD to the GMCH |
| GDRUNPWROK | Internal PLD name for output system power good signal |
| GMCCPURST- | Internal PLD name for CPU reset signal form the graphics memory control hub (GMCH) |
| GMCPCIRST- | Internal signal name for the PLD peripheral component interconnect (PCI) bus reset output to the GMCH |
| GMUXSEL | Internal PLD signal name for the core regulator multiplexer select line. |
| I_CPUINIT- | Processor INIT signal input to PLD. A low on this signal indicates system logic wants to initialize the processor. |
| I_GMUXSEL | Speedstep multiplexer control signal from the core logic. A high on this signal indicates the core voltage regulator should output performance mode voltage to the processor. |

-continued

| Signal | Definition |
|---|---|
| I_SLP_S3- | Sleep S3 signal from the core logic. A high on this signal indicates the system is in the S3 power state. |
| ICPUPWRGD | Input CPU power Good to the PLD |
| ICPUSLP- | Processor CPU sleep signal input into the PLD |
| INIT-<br>INIT* | Active low init signal to the processor |
| IPCIRST- | PCI reset signal input into the PLD |
| ISTPCLK- | Stop clock input into the PLD |
| LAN_PWROK | Power good signal for the LAN controller in the I/O control hub module (ICH2M) |
| P_LO/HI- | Power management controller control signal for performance or battery optimized processor state. |
| PCIRST-<br>PCIRST* | PCI reset signal |
| PERFORMANCE- | Power management controller performance output mode |
| PLDRST- | Reset signal input to the PLD used to initialize PLD logic. This signal is connected to the system suspend power plane reset signal (SUS_RST-) |
| SUS_RST<br>SUS_RST- | System suspend power plane reset signal. |
| PWROK | This is the power good indication to the ICH2M core logic. |
| RESET_OUT- | This signal is the output of the power management controller used to put the system into reset condition. |
| SLP_S3- | Output of the ICH2M which indicates the system is in the S3 power state. |
| STPCLK-<br>STPCLK* | Stop clock signal generated by the ICH2M. This signal when active low forces the processor into Quick start or stop grant state. |
| SUSCLK | 32 KHz suspend clock. |
| SUSSTAT<br>SUSSTAT- | Suspend status signal from the ICH2M |
| VCC_SUS | Suspend power |
| VCCT-OK | Power supply core I/O voltage power good indication. |
| VCORE_PWRGD | Logical AND of Processor Core and I/O power good signals. |
| VRMPWRGD | Internal PLD signal name for core regulator power good signal. |
| VCORE-OK | Power supply processor core voltage power good indication. |
| VGATE | ICH2M input signal used as an input of core regulator power good signal. This signal is gated or blocked during Speedstep ® transitions to prevent a processor or system reset. |

Now referring to FIGS. 4a–4d, illustrated is a schematic diagram of the PLD. The PLD controls the timing and reset condition from the processor to allow the processor to enter C3 or deep sleep state in order to force an operating mode transition. The PLD sends control signals to the processor to initiate a transition to and back from the C3 state. The control signals may be passed from a chipset controller or are initiated by the PLD. The PLD relies on various latches, clock cycles, and a counter to control transition signals to the processor.

Latch 250, latch 215, latch 220, latch 225, latch 230, latch 235, and latch 210, receive the SUSCLK signal which is a 32 kilohertz suspend clock signal. These are D-type latches that receive input values and trigger on the pulse train signal SUSCLK. The latched value contains the received value depending upon the condition of SUSCLK.

In the event of a power state transition, a special cycle occurs in the PLD. Latch 210 determines when the special cycle occurs. Latch 210 ignores clock transitions due to the active high enable signal being tied low. The output of latch 210 will reflect the last active preset or clear condition. An active true (low) condition on PCIRST or SUSRST will force latch 210 output to a high state. Counter 200 counts the number of SUSCLK cycles. A count of 5 on counter 200 drives ENDCYC- signal low, which clears latch 210 output to a low state.

The output of latch 210 inputted through logical AND gate 305 sets the signal HCYCLE, either halting or continuing a cycle. Other determinative conditions passed through logical AND gate 305 that affect HCYCLE are DISABLE signal and fake suspend to random access memory (RAM) cycle indicator Fake-S3. An output high (value of one) from logical AND gate 305 indicates that a special cycle will be run. An output low (value of zero) from logical AND gate 305 indicates no special cycles.

Whenever the signal PCIRST- or the signal SUSRST- is activated, it is indicated that a transition is to be performed. Coming out of reset conditions, the PLD performs control of the transition. The output value of AND gate 305 therefore is set high when latch 210 is high and PCIRST- and SUSRST- are both inactive (high). When that cycle is complete, latch 210 is reset. ENDCYC- directly clears latch 210. CYCREGCLR- sets the HCYCLE latch by presetting register 210 to a value of one.

If the signal HCYCLE is positive (value of one), latch 250 outputs a low on the next rising edge of the SUSCLK clock cycle. Once latch 255 asserts a true (high) on counter, 200, counter 200 is enabled for the special cycle.

Counter 200 receives from latch 255 the signal CNT_EN, the count enable signal. Counter 200 also receives the signal SCLR which represents synchronous clear. In order to begin counting, the conditions of CNT_EN and SCLR must both be high (value of one).

SCLR is the synchronous clear of counter 200. Counter 200 is cleared on the rising edge of any SUSCLK with SCLR signal in a high state. SCLR resets counter 200 to zero when PCIRST- is low, SUSRST- is low, or ENDCYC- is low. This assures the counter starts at zero when a cycle is to be run and also forces ENDCYC- to be only one SUSCLK clock cycle in width. SCLR is set high if any of bus reset, suspend reset, or end cycle conditions are set low (not activated).

Figure 5A:
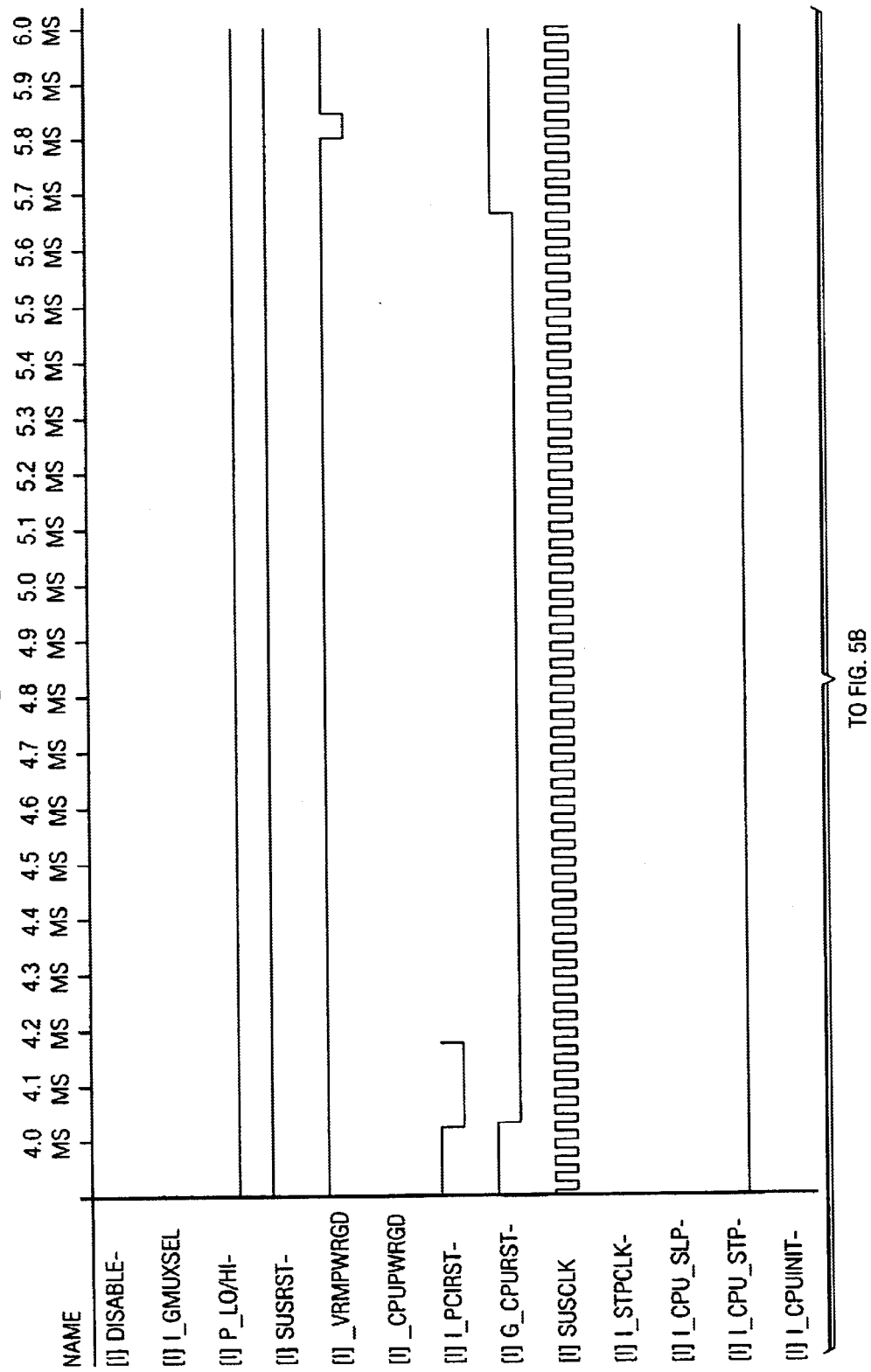
FIGS. 5a–5b are a timing diagram of signals related to the PLD counter.
Figure 5B:
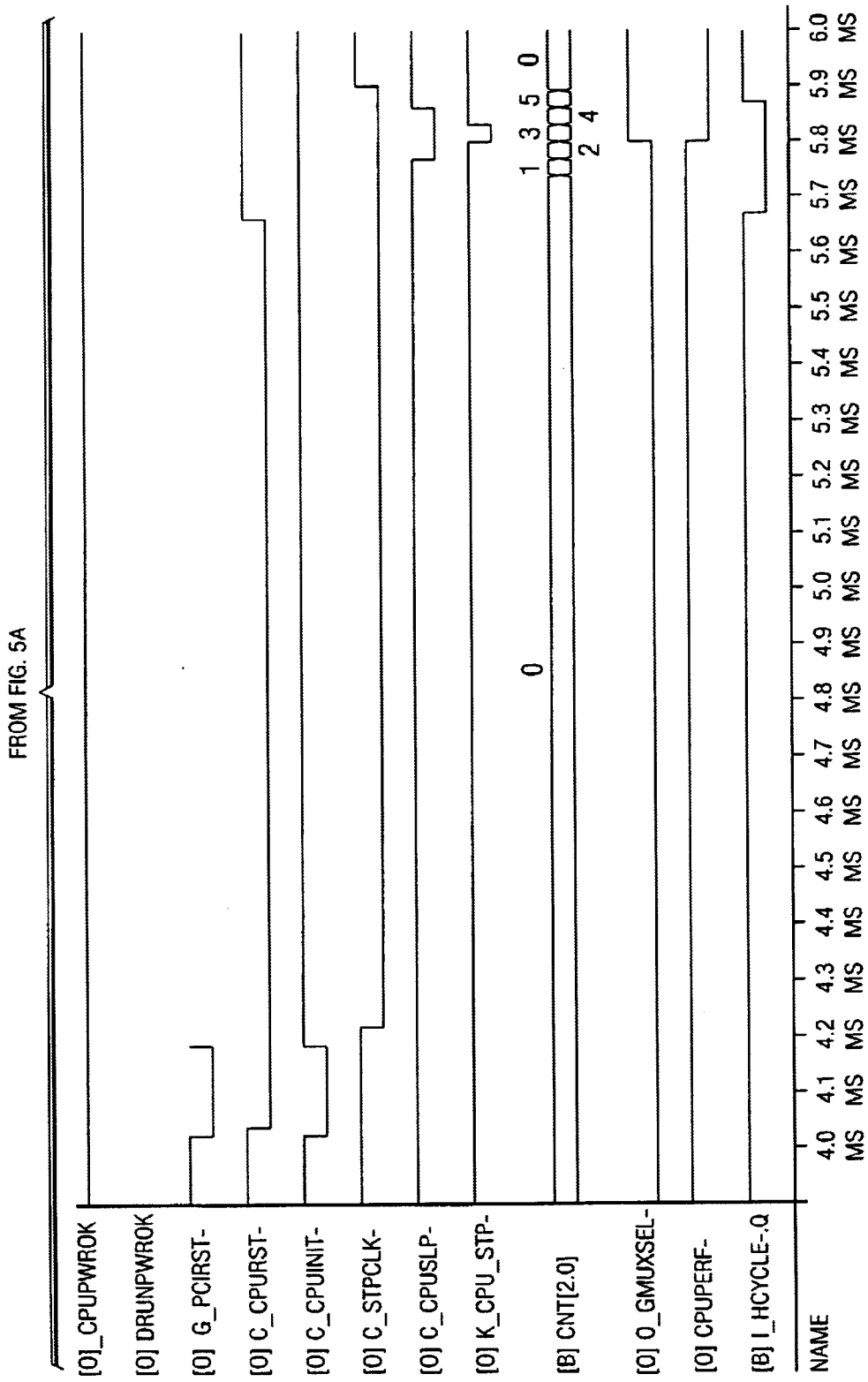

Now referring to FIGS. 5a–5b, a timing diagram is shown relating PLD control signals with counter 200 outputs CNT [0], CNT[1], and CNT[2]. The counter provides sufficient time to perform performance mode transitions.

The PLD asserts STPCLK- to the processor at the first rising edge of SUSCLK after PCI reset is de-asserted. CPURST- to the processor remains asserted for 1 millisecond after PCIRST- goes inactive (high).

Referring back to FIGS. 4a–4d, Latch 250 and latch 255 delay the initiation of counter 200 for a minimum of one SUSCLK period after CPURST- goes inactive.

Referring back to FIGS. 5a–5b, the CPUSLP- signal will be asserted on the rising edge of SUSCLK with the counter output equal to a value of 1. This provides sufficient delay, the minimum being 3 SUSCLK cycles, for the processor to achieve the Stop Grant state and eliminates the need to monitor a system bus for the Stop Grant Acknowledge bus cycle before asserting the CPUSLP- signal to the processor. This puts the processor into the Sleep state. One SUSCLK cycle later the CPU_STP- signal will cause the processor clock to be stopped which forces the processor into the C3 state.

At the same time the STP_CPU- signal is asserted to the processor, the GMUXSEL signal indicates the voltage to output for the new processor operating mode. The CPUPERF- signal is sent to the processor indicating the operating mode it should be in upon exiting the C3 state.

The CPU_STP- signal remains asserted for one SUSCLK period and then de-asserts. One SUSCLK period later the CPUSLP- signal will be de-asserted bringing the processor into the Stop Grant state. And one SUSCLK period later the STPCLK- signal will be de-asserted bringing the processor into the C0 or operating state.

Referring back to FIGS. 4a–4d, the true and compliment values of CNT2, CNT1, and CNT0 are passed through to comparator 205. From comparator 205 the values are passed through OR gate 206 and the value is stored in latch 215. The output of latch 215 is the signal S_SLP. S_SLP and CPU_SLP (processor sleep signal) are input into logical AND gate 260. The output signal of logical AND gate 260 is C_CPUSLP. The compliment of the value from latch 220 and the signal CPUSTP are input into logical AND gate 265. The output of logical AND gate 265 is the signal CK_CPUSTP.

C_CPURST- is the processor reset signal, a low (value of Ø) forces the processor to reset itself. This reset condition takes place if a special suspend to RAM is requested or if the system requests a processor reset. The processor is placed into C3 state by initiating a reset condition of the processor.

Latches 215, 220, 225, and 230 provide register outputs for the CPU_SLP-, CPU_STP-, STPCLK-, and CPURST- signals. This is necessary to prevent glitches due to the transitions of counter 200 outputs propagating through comparator 205 and the combinatorial logic behind it.

Latch 215, latch 220, and latch 225 may be reset when the ENDCYC- signal or the signal SUSRST- are activated low. A compliment of the value of latch 225, the signal STPCLK-, and the signal I_STPCLK- are input into logical AND gate 270 to arrive at the signal C_STPCLK-.

Latch 225 outputs a logic value one when HCYCLE is true, PCIRST- is not active, and CPURST- is not active and counter value is 2, 3, or 4. This condition value is latched until "end_susclr-" goes low. This occurs when either ENDCYC- goes true, or SUSRST- goes true. Logical AND gate 270 provides a low output on the C_CPUSTP- signal when any of the following signals are true (value of one): I_STPCLK-, latch 225, or CNT_EN.

The logic provides the ability to force the processor into the C3 state from C0 state and back into the C0 state during the normal power up sequence of the computer system. This process takes place upon a reset request as previously described. The logic asserts the appropriate control signals to the processor and the clock. This sequence occurs prior to the core logic chipset being initialized and prevents conflicts with the lack of support of the C3 state by the chipset.

Suspend to RAM

S3 is an ACPI defined system state and generally refers to a suspend to random access memory (RAM) condition. In the S3 state power is turned off to everything except system memory, the memory controller, and the power management controller (power management control logic). S0 is an operating system state. By allowing a system to perform an S3 state transition, the capability exists to have the processor perform a power state transition. As the system enters S3 state, the processor enters into C3 state and when exiting C3 is able to make the performance mode changes.

A processor will enter a C4 state when the system is put into an S3 state. During an S3 state transition, the processor writes context into memory, and when power returns retrieves the context so that the processor maintains previous status.

An S3 transition can take many seconds and approach a minute or more to achieve the S3 state and resume from the S3 state back to the S0 state. Normal S3 transitions remove power from all but the memory, memory controller, and the power management control logic. All other system devices will therefore need to save their state to system memory before the S3 transition and then have that state restored upon the system returning to the S0 state.

Intel® Speedstep™ technology provides a "dynamic transition" when alternating current (AC) is plugged in or removed. This is accomplished by putting the processor into the C3 state and returning it back to the C0 state. If both the processor and chipset controllers support the C3 state and Intel® Speedstep transitions, the system remains in the S0 state and the transition occurs in around 100 microseconds.

It is contemplated that in performing a "Fake S3" transition a processor will be transitioned into and out of the C3 state, and cause a Stop Grant Acknowledge bus cycle to be generated on the processor bus. A chipset power management controller does not expect a Stop Grant Acknowledge bus cycle to occur, and the chipset and controller mayor may not respond correctly. It is important to assure that the chipsets do not receive unsolicited Stop Grant Acknowledge bus cycles.

In a "Fake S3" transition a processor is not reset and processor power is not removed.

The FAKE_S3 signal 299 is set to a logic one at the PLD input by BIOS. The BIOS then performs a partial save of system contents for the pending Fake S3 transition, with only the chipset state and part of the processor state is required to be saved. The chipset will be reset and the processor will receive an INIT signal. The INIT signal will not clear all the register and state contents of the processor. The rest of the system will not have to be reset.

The BIOS initiates an S3 state transition on the chipset. The chipset transitions the system into S3 state except that the PLD blocks the reset to the system and the processor and also prevents the power supplies from being turned off. The PLD transitions the processor to the C3 state instead of the off state. The chipset however does see a reset.

As soon as the chipset gets the system into the S3 state the PLD assets a "wake" condition (O-WAKE- goes low) causing the chipset to immediately begin an S3 to S0 state transition.

Early in the boot sequence the BIOS checks for the boot type and determines that this is a Fake S3 recovery and restores the appropriate chipset and processor states.

With non-supporting chipsets the transition is expected to occur in 1 to 10 milliseconds instead of approaching a minute or more for the full SØ-S3-SØ transition sequence.

The value FAKE_S3 and the disable signal DISABLE- (active when the value is set low) are input into logical AND gate 280, the output of logical AND gate 280 is the signal FKE_S3. FKE_S3 and the compliment value of I_SLP_S3- (signal indicating that system is in S3 mode) are input into logical AND gate 285. The output of AND gate 285 enables latch 235. Latch 235 receives the clock pulse signal SUSCLK, and outputs a high value (value of one) on the first rising edge of SUSCLK when enable is high.

The complement value of the output of latch 235 is defined as the signal O_WAKE, which is the wake signal to the power management controller. The FKE_S3 signal and the I_SLP_S3- signal are input into logical OR gate 287. The output of logical OR gate 287 and the SUSRST- signal re input into logical AND gate 290. The output of logical AND gate 290 is O_SLP_S3 is the output SLEEP_S3 signal to the system electronics.

Latch 235 outputs a wake indication (active high) to the system at the next rising edge of SUSCLK after the system enters S3 state as indicated by the assertion of the I_SLP_S3- signal. This state is held until it is cleared by de-asserting the FAKE_S3 signal.

Logical AND gate 285 allows the inverted (compliment) value of FKE_S3 to assert the wake signal only if DISABLE- is in the high state. Logical AND gate 290 assures that the O_SLP_S3- signal is low if the SUSRST- signal is low. Logical OR gate 287 forces the O_SLP_S3- output signal high during the Fake S3 transitions. This blocks the SLP_S3 signal to the parts of the system that control power switches and regulators.

Performance mode setting is represented by the signal P_LO/HI-. P_LO/HI- is an input value received by the PLD. The compliment value of P_LO/HI- and the signal DISABLE- signal are input into logical AND gate 292, the value of output of AND gate 292 is stored in latch 245. Latch 245 outputs the value as the signal GMUXSEL. The compliment value of Latch 245 is a PLD output value called CPUPERF. A low value (value of zero) for CPUPERF- represents the high performance mode, and a high value (value of one) represents the battery optimized mode. The VRMPWRGD signal is the signal to the PLD showing that core regulator power is good. VRMPWRGD, the value of latch 215, and FKE_S3 are input into logical OR gate 295, and the output value of OR gate 295 is GDRUNPWROK.

SLP_S3 and SUSSTAT are the pass through signals that control the power supply that prevents the system from going into a full system suspend.

The disable signal prevents the PLD from doing any transition and allows the PLD to pass signals straight across.

Figure 6:
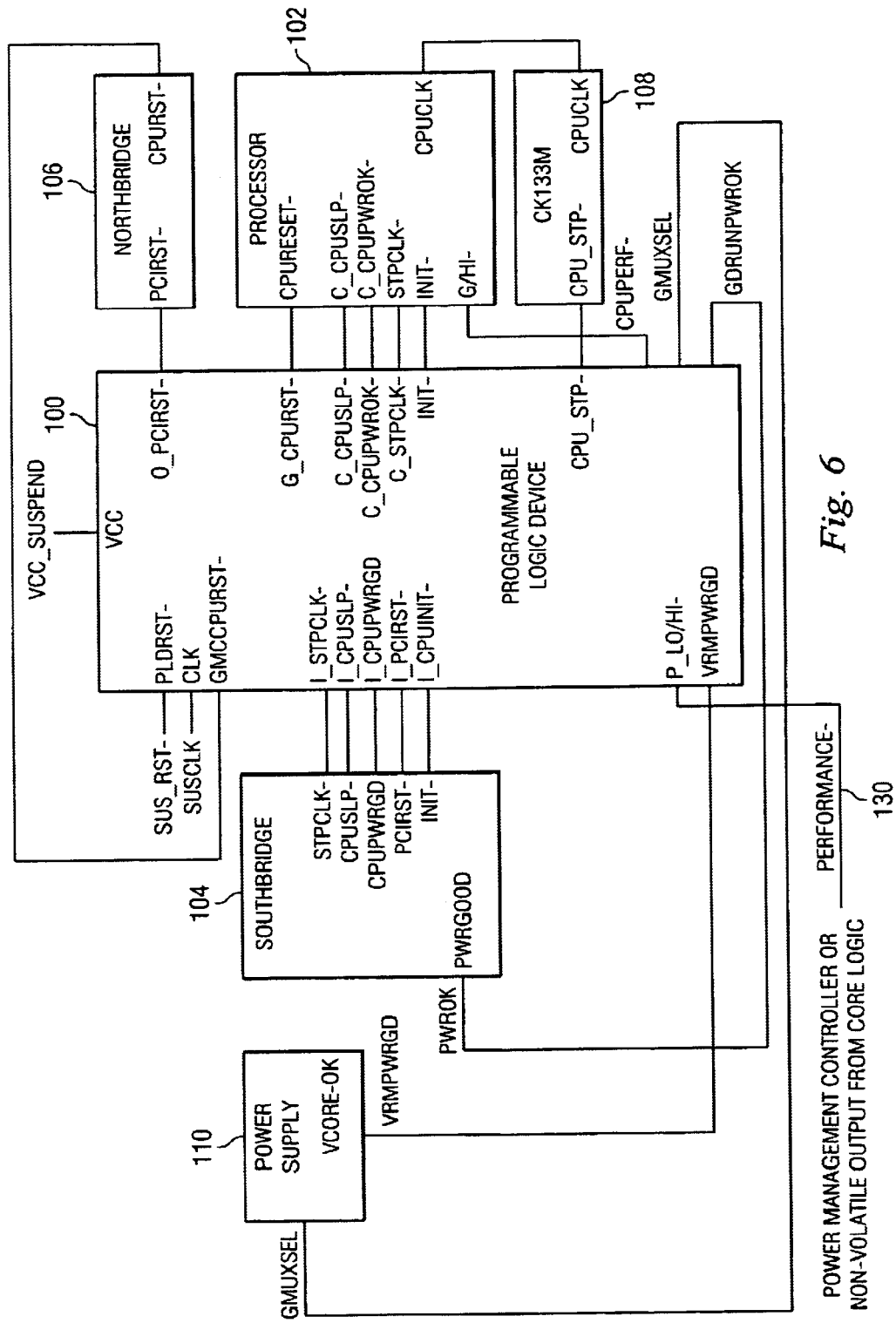
FIG. 6 a block diagram of a PLD providing power state transitions from a chipset to a power conserving processor.

Now referring to FIG. 6, illustrated is a system block diagram of a logic device conducting full transition control to a processor. The logic device 100 interfaces to a processor 102, a north-bridge controller 106, a south-bridge 104, and a power supply 110.

A PERFORMANCE- signal 130 is provided to the PLD 100 to indicate the desired performance mode of the processor 102 after the next system reset. When the processor 102 comes out of reset the PLD 100 will force a C3 state transition and put the processor 102 into the performance mode defined by PERFORMANCE- signal 130 received by the PLD 100 as P_LO/HI-. The PLD 100 sends out CPU_PERF- and GMUXSEL signals to the processor 102 during the C3 or deep sleep state. PLD 100 also will send a CPU_STP- signal to the clock 108. Clock 108 in turn halts the clock signal to the processor 102.

The performance mode transition is made by the PLD 100 to the power supply 110. The signal GMUXSEL informs power supply 110 that a different voltage must be applied, either a higher voltage for a transition to the higher performance mode or a lower voltage for battery optimized mode. Verification signal VCORE-OK is sent back by the power supply 110 to PLD 100, and is received as the signal VRMPWRGD.

The north-bridge controller 106 interfaces to the processor 102 via a processor bus, however, other communication busses may be used. The north-bridge controller 106 interfaces to a south-bridge controller 104 via a PCI bus; however, other communications busses may be used. The north-bridge controller 106 interfaces to a south-bridge controller 104 via a PCI bus; however, other communications busses may be used. In this particular disclosure, the PCI reset signals are shown which relate to the power state transitions to be made to the north-bridge controller 106. The PLD 100 sends a signal O_PCIRST- to the north-bridge controller 106. North-bridge controller 106 receives this as a PCIRST- signal. The PCIRST- signal is the PCI reset signal. The north-bridge controller 106 in turn sends out a CPURST- signal back to the PLD 100. The CPURST- signal is the processor reset signal input to the PLD 100.

The north-bridge controller 106 is also known as a graphic memory control hub (GMCH) controller. The GMCPURST- signal is the internal PLD signal for reset output to the north-bridge controller 106.

PLD 100 sends a GDRUNPWROK signal to the south-bridge controller 104. The signal is received by the south-bridge controller 104 as the signal PWROK. The signal GDIRUNPRWOK is the PLD 100 signal indicating that output for the system is good. GDRUNPWROK and other "power okay" signals indicate power verification good or are used to create a reset condition.

South-bridge controller 104 outputs to the PLD 100 the following signals STPCLK CPUSLP, CPUPWRGD, PCIRST, and INIT. STPCLK- is the stop clock signal from the south-bridge controller 104 to the PLD 100. STPCLCK when tied low (value of zero) forces the processor into a "quick start" or "stop grant" state. CPUSLP* is the sleep control signal input to the PLD 100. CPUPWRGD is the signal to the PLD 100 indicating that power is good. PCIRST is the peripheral component interconnect (PCI) bus reset signal to the PLD 100. INIT is the initiate signal to the processor 102. The initiate signal is received as I_CPUINT by PLD 100. South-bridge controller 104 is the interface of I/O devices to the processor 102. In this particular embodiment PLD 100 performs the necessary power state transitions from I/O devices to initiate the processor 102. Operator or device initiated transitions go through the south-bridge controller 104.

PLD 100 outputs signals GCPURST, C_CPUSLP-, C_CPUPWROK, C_STPCLK-, and INIT- to the processor 102. G_CPURST is the processor reset signal from PLD 100 to processor 102. C_CPUSLP is a control signal that sends a sleep command to the processor from the PLD 100. C_STPCLK- is the stop clock signal from the PLD 100 to the processor 102. INIT- is the initiated signal to the processor 102 from the PLD 100.

CPUPERF, the performance mode indicating signal is sent from PLD 100 to processor 102. The processor 102 receives the performance signal as G/HI-. The CPUPERF- is the performance mode indicating signal to the processor 102; a low (value of zero) during processor exit of the C3 state causes the processor to transition to the performance mode.

Figure 7:
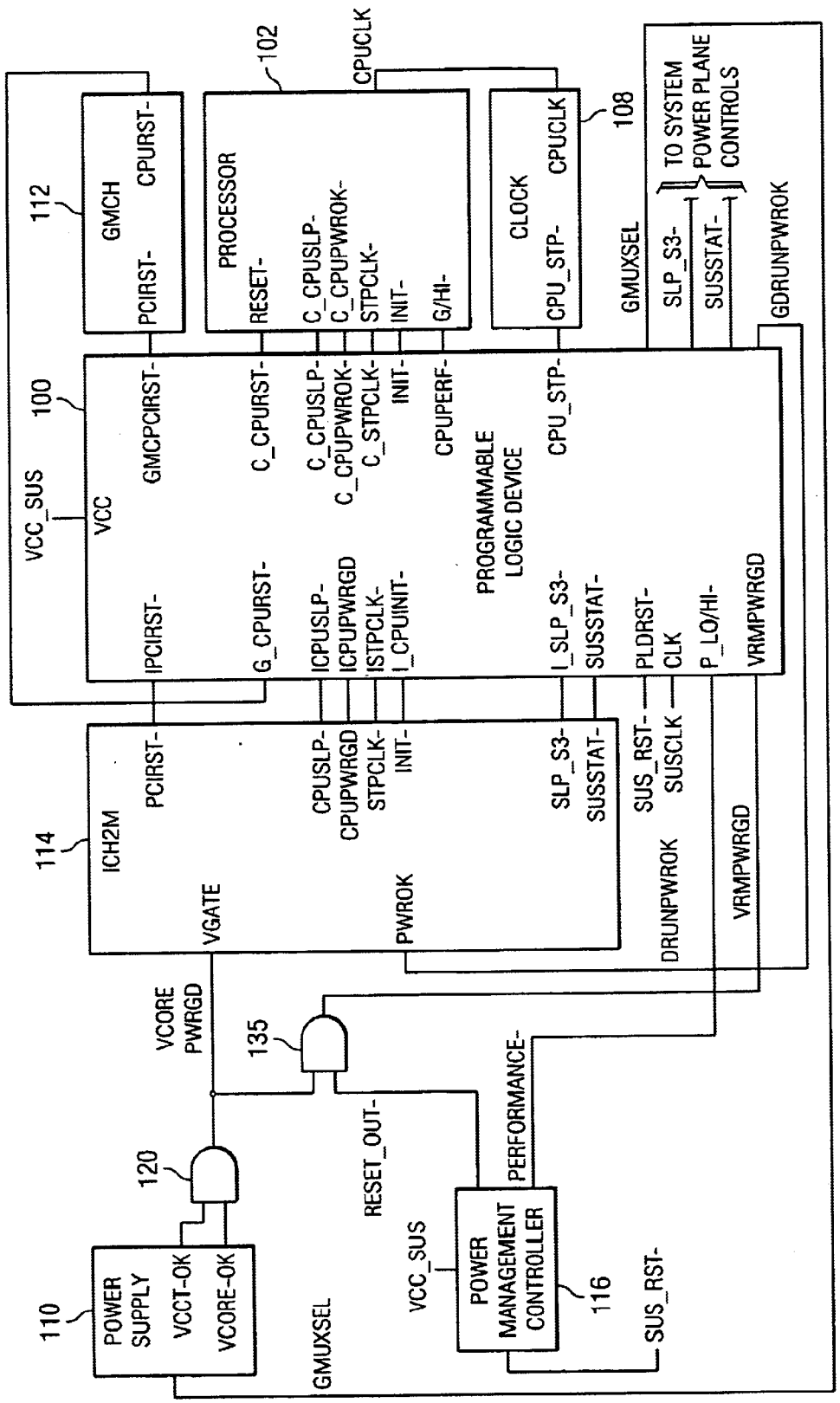
FIG. 7 is block diagram of a PLD providing limited power state transition control from a controller capable of providing power state transitions.

Now referring to FIG. 7, a mixed controller chipset is illustrated. The mixed controller chipset includes an input/output control hub module (ICH2M) 114 and a graphics memory control hub (GMCH) 112 interfacing to the PLD 100 and the processor 102 of a PC system. Mixed chipset controller is referred to because in this embodiment the ICH2M 114 is capable of performing C3 power state transitions to the process or 102, however, the GMCH 112 does not support the proper handshaking needed by the ICH2M 114 to complete the transitions. The PLD 100 is inserted between ICH2M 114 and processor 102. The PLD 100 passes through power state transitions asserted by ICH2M 114 and will also assume control of the respective output signals to the processor in order to facilitate processor performance state transitions.

The signal P_LO/HI- is received by the PLD 100 from the system power management controller 116. This signal when active low causes the PLD 100 to put the processor in performance mode when coming out of reset. The PLD 100 asserts CPUPERF- low and GMUXSEL high when the processor is in C3 state during the PLD 100 controlled performance mode transition. GMUXSEL goes to the power supply 110 from the PLD 100 and initiates the appropriate voltage to be applied to the processor 102. CPUPERF- is sent to the processor 102 and indicates the internal operating frequency multiplier that should be used when the processor 102 exits C3 power state. A low value for CPUPERF- causes the processor 102 to exit C3 state in performance mode. A high value for CPUPERF- causes the processor 102 to exit C3 state in battery optimized mode.

With suspend power supplied to the PLD 100 at all times the primary control for initiating power mode transitions on the processor 102 is the IPCIRST- signal to the PLD 100. IPCIRST- comes from the ICH2M 114 and is passed through to the GMCH 112 as GMCPCIRST- and is used to cause a system reset. When the PLD 100 sees the GMCPCIRST- signal go low, the PLD 100 waits 2–3 SUSCLK periods and asserts C_STPCLK-.

GMCH 112 drives its output CPURST- low when PCIRST- goes low and maintains the low state on CPURST- for 1 millisecond after PCIRST- goes inactive. PLD 100 will pass CPURST- on to the processor 100 on C_CPURST- signal and begin a processor mode transition on the rising edge.

ICH2M 114 output signals SLP_S3- and SUSSTAT- go to the PLD 100 and are passed through on PLD 100 output signals SLP_S3- and SUSSTAT-. These signals are passed through the PLD 100 unless a Fake S3 cycle is run. These signals typically control power planes within a portable computer and are controlled by the PLD 100 for Fake_S3 cycles.

Logical AND gate 120 combines the two output power good indications from the core voltage regulator in power supply 110 into a single signal VCORE_PWRGD. VCORE_PWRGD is supplied to ICH2M 114 as the signal VGATE. The ICH2M 114 combines VGATE and PWROK (connected to PLD output GDRUNPWROK).

Logical AND gate 135 provides resetting the entire system from the power management controller. If either the AND gate 120 output VCORE_PWRGD or power management controller RESET_OUT- output goes low then the system will reset.

When the PLD 100 controls the processor operating mode transitions, the GMPCIRST- and GDRUNPWROK signals are held in a safe state to prevent inadvertent system reset due to the core voltage regulator output voltage of the power supply 110 from becoming temporarily out of spec while voltage transitions are in process.

The foregoing description, for purposes of explanation, used specific nomenclature to provide a thorough understanding of the disclosure. However, it will be apparent to one skilled in the art that specific details are not required in order to practice the embodiments. Thus, the foregoing descriptions of specific embodiments of the present disclosure are presented for purposes of illustration and description; they are not intended to be exhaustive or to limit the disclosure to the precise forms disclosed, obviously many modifications and variations are possible in view of the above teachings. For example, different logic may be employed using similar discrete components. Different timing diagrams may be employed to transition power states. The embodiments were chosen and described in order to best explain the principles of the disclosure and its practical applications and to thereby enable others skilled in the art to best utilize the various embodiments with various modifications as are suited to the particular use contemplated. It is intended that the scope of the disclosure be defined by the following claims and their equivalents.

What is claimed is:

1. A computing system comprising:

a processor with various power state conditions, wherein the processor performs at a selectable operating mode;

a north-bridge controller initiating a processor reset signal input;

a south-bridge controller providing an interface for I/O devices to the processor;

means for resetting the processor;

a clock;

a power supply; and a logic device interfaced to the processor, the north-bridge controller, the south-bridge controller, the clock, and the power supply, whereby the logic device asserts a transition to a different operating mode on the processor while the processor is in a deep sleep power state, and upon transition back to operating power state, the clock provides a frequency and the power supply provides a voltage matched to the different operating mode, and whereby the logic device provides control signals to the processor to cause the deep sleep immediately after reset.

2. The computing system of claim 1 wherein the logic device monitors the reset condition of the processor, waits for reset to be de-asserted and asserts a performance mode transition.

3. The computing system of claim 1 wherein the logic device passes transition signals from the north-bridge controller to the processor, the transition signals placing the processor in a deep sleep power state and asserting a performance mode transition.

4. The computing system of claim 1 wherein the logic device passes transition signals from the south-bridge controller to the processor, the transition signals placing the processor in a deep sleep power state and asserting a performance mode transition.

5. The computing system of claim 1 wherein the logic device asserts the transition during the normal processor power up sequence.

6. The computing system of claim 1 wherein the logic device asserts the transition following the processor first read only memory (ROM) access.

7. A method of transitioning a processor having various power state conditions wherein the processor operates a selectable operating mode, comprising:

providing a north-bridge controller, the north-bridge controller initiating a processor reset signal input;

providing a south-bridge controller, the south-bridge controller providing interface for I/O devices to the processor;

resetting the processor; and providing a clock, a power supply and a logic device, the logic device interfaced to the processor, the clock and the power supply, whereby the logic device provides control signals to the processor to cause a deep sleep transition to the processor immediately after reset.

8. The method of claim 7 wherein asserting a performance mode is during normal processor power up sequence.

9. The method of claim 7 wherein asserting a performance mode is during processor read only memory (ROM) access.

* * * * *